United States Patent
Macklin et al.

(10) Patent No.: US 7,189,476 B1
(45) Date of Patent: Mar. 13, 2007

(54) RECHARGEABLE LITHIUM CELL HAVING AN ANODE COMPRISED OF CARBON NANOTUBES

(75) Inventors: William John Macklin, East Hendred (GB); Derek John Fray, Great Shelford (GB)

(73) Assignee: ABSL Power Solutions Ltd., Abingdon (GB)

( * ) Notice: Subject to any disclaimer, the term of this patent is extended or adjusted under 35 U.S.C. 154(b) by 346 days.

(21) Appl. No.: 10/069,011

(22) PCT Filed: Aug. 18, 2000

(86) PCT No.: PCT/GB00/03211

§ 371 (c)(1),
(2), (4) Date: Mar. 14, 2002

(87) PCT Pub. No.: WO01/15251

PCT Pub. Date: Mar. 1, 2001

(30) Foreign Application Priority Data

Aug. 21, 1999 (GB) .................................. 9919807.9

(51) Int. Cl.
*H01M 4/58* (2006.01)
*H01M 4/60* (2006.01)

(52) U.S. Cl. .............................. 429/231.8; 429/231.95; 429/212

(58) Field of Classification Search ............. 429/231.8, 429/231.95, 231.9
See application file for complete search history.

(56) References Cited

U.S. PATENT DOCUMENTS

| | | | | |
|---|---|---|---|---|
| 4,945,014 | A * | 7/1990 | Miyabayashi et al. | 429/231.95 |
| 5,457,343 | A * | 10/1995 | Ajayan et al. | 257/734 |
| 5,561,007 | A * | 10/1996 | Saidi | 429/224 |
| 5,879,836 | A * | 3/1999 | Ikeda et al. | 429/231.8 |
| 6,090,363 | A * | 7/2000 | Green et al. | 423/447.1 |
| 6,177,213 | B1 * | 1/2001 | Fetcenko et al. | 429/218.1 |
| 6,280,697 | B1 * | 8/2001 | Zhou et al. | 423/414 |
| 6,709,471 | B2 * | 3/2004 | Miyamoto | 29/623.1 |

OTHER PUBLICATIONS

"Carbon nanotubule membranes for electrochemical energy storage and production", Che et al., Nature 393, 346-349 (May 28, 1998).*

* cited by examiner

*Primary Examiner*—Patrick Joseph Ryan
*Assistant Examiner*—Julian Mercado
(74) *Attorney, Agent, or Firm*—William H. Holt

(57) ABSTRACT

An anode for a rechargeable lithium cell comprises carbon nanotubes that contain within them an element that can form alloys or compounds reversibly with lithium over a range of compositions. The element within the nanotubes may be aluminum or tin. These carbon nanotubes are bound together to form a coherent layer with a polymeric binder, such as a polymer of viniylidene fluoride. A cell with such an anode should have improved capacity and improved reversibility, because the nanotubes provide a stabilizing framework for the alloy.

6 Claims, No Drawings

RECHARGEABLE LITHIUM CELL HAVING AN ANODE COMPRISED OF CARBON NANOTUBES

This invention relates to an anode for a rechargeable lithium cell, and to a cell incorporating such an anode.

For many years it has been known to make cells with lithium metal anodes, and cathodes of a material into which lithium ions can be intercalated or inserted. A wide variety of intercalation or insertion materials are known as cathode materials for rechargeable lithium cells, such as $TiS_2$, $V_6O_{13}$ and $Li_xCoO_2$ where x is less than 1; and these materials are often mixed with solid electrolyte material to form a composite cathode. To avoid the problems arising from dendrite growth at lithium metal anodes during cycling, it has been proposed to use an intercalation material such as graphite as the anode material, and this also may be mixed with solid electrolyte material to form a composite anode. Rechargeable cells of this type, in which both the anode and cathode contain intercalated lithium ions, are now available commercially, and may be referred to as lithium ion cells, or as swing or rocking-chair cells.

Another known possibility is to use, as the anode material, a metal such as aluminium that forms an alloy with lithium. However, repeated cycling of a cell with a lithium/aluminium alloy anode leads to volumetric changes and structural damage. Tin oxide has also been suggested as a reversible anode material in a lithium ion cell. The lithium insertion process is believed to proceed by the initial reduction of the tin oxide, followed by reversible formation of the lithium alloy. While the repeated insertion and removal of lithium into bulk tin metal tends to show poor reversibility due to large volumetric changes, improved stability of tin oxide anodes is observed due to the presence of an oxide framework surrounding the metallic tin particles.

The use of carbon nanotubes in the anode of a secondary lithium cell has been suggested in JP-A-10-125321 (Sony). The use of carbon nanotubes doped (at a concentration less than 100 ppm) with an alkali or alkali-earth metal of low ionisation potential in the anode of a lithium secondary cell has been suggested in JP-A-09-045312 (Matsushita); the doping metal is believed to improve the electronic conductivity of the carbon.

According to the present invention an anode for a rechargeable lithium cell comprises carbon nanotubes that contain within them a metal or a metalloid selected from aluminium, tin, metallic alloys containing aluminium or tin, or silicon, that can form alloys reversibly with lithium over a range of compositions.

The term alloy should be understood as encompassing both conventional alloys and lithium/elemental compounds of the general formula $MLi_x$, where M represents the other element (metal or metalloid) and x may have a range of different values.

Preferably the carbon nanotubes are bound together by a polymeric binder, which may for example be polyvinylidene fluoride.

The present invention also provides a rechargeable lithium cell incorporating an anode as specified above, a reversible cathode, and an electrolyte. The electrolyte may be either a solid polymeric electrolyte, or a liquid electrolyte. Where the electrolyte is a liquid, an inert, liquid-permeable separator is usually provided to separate the anode from the cathode. A variety of different intercalation materials may be used in such a cathode.

Such a cell can be expected to have improved capacity and improved reversibility, because the nanotubes will provide a stabilising framework for the alloy. The carbon nanotubes may also provide additional lithium intercalation capacity.

Carbon nanotubes are tube-like structures of diameter no more than a few nanometres, but which may be several micrometres in length. They can be considered as a sheet or hexagonal lattice of carbon atoms (as in a layer of graphite) which has been rolled up to make a cylinder, with a hemispherical cap like half a fullerene molecule at each end. The nanotubes can be characterized by their diameter, and their helicity, which is determined by the axis about which the sheet is rolled. They have been made by laser vaporisation of a carbon target in a furnace, in the presence of a cobalt/nickel catalyst; they have also been made using a carbon arc.

The invention will now be further and more particularly described, by way of example only. Carbon nanotubes are prepared electrolytically, by using a carbon electrode as cathode in a bath of molten salt, such as sodium chloride. It is believed that, on the application of current, sodium is forced into the graphite structure and this induces the extrusion of the nanotubes. A less stable salt, such as tin chloride, is also introduced into the molten salt bath. This decomposes first, and the resulting metal (tin) is initially deposited onto the surface of the graphite. It is found that the nanotubes resulting from this procedure contain the metal of the less stable salt inside the nanotubes. After electrolysis, the salt is dissolved in water; the nanotubes remain in suspension, but will collect at the interface between the aqueous solution and an immiscible organic liquid. In this way the nanotubes can be produced with high yield.

The tin-filled nanotubes made as described above are thoroughly dried. The nanotubes are then used to make an anode, by mixing 90 parts by weight of the nanotubes with 10 parts of polyvinylidene fluoride homopolymer (PVdF), forming a slurry with N-methyl pyrrolidone (NMP) as solvent for the PVdF, casting onto a copper foil current collector, and thoroughly drying the cast layer to remove the NMP solvent. A similar procedure is then used to make a cathode, mixing lithium cobalt oxide, carbon and PVdF with NMP as solvent to form a slurry, casting onto an aluminium foil current collector, and thoroughly drying the cast layer to remove the NMP solvent. The anode and the cathode are then separated by a microporous polyethylene separator, wound up to form a coil, and inserted into a can. The can is then filled with organic liquid electrolyte consisting of 1M $LiPF_6$ dissolved in ethylene carbonate/ethyl methyl carbonate mixture, and sealed.

It will be appreciated that an anode comprising only nanotubes and a polymer binder (such as polyvinylidene fluoride) is suitable where the anode is to be used in a cell with a liquid electrolyte. An alternative anode incorporates plasticising solvent (such as ethylene carbonate or propylene carbonate) along with the nanotubes and the polymer binder, and a lithium salt, and is suitable for use with a solid polymer electrolyte. A further alternative anode incorporates plasticising solvent, nanotubes and polymer binder, but no lithium salt. Such an anode would be easier to handle, as an anode containing lithium salt must be kept in a totally dry environment.

To produce aluminium-filled nanotubes the electrolysis process is substantially the same as that described earlier, except that the less stable salt to be added to the molten salt bath is aluminium chloride.

Thus an alternative cell may be made as follows, using aluminium-filled nanotubes that have been thoroughly dried. Forty eight parts of the nanotubes are mixed with 24 parts of the volatile solvent tetra-hydrofuran to produce a slurry (all parts are parts by weight). This is then mixed with a polymer solution containing six parts of a PVdF copolymer, 30 parts of salt solution (1 M LiPF$_6$ in a mixture of three parts ethylene carbonate to two parts propylene carbonate), and 40 parts tetrahydrofuran. This mixture is then cast, using a doctor blade over a roller with a blade gap 0.5 mm, onto a copper foil, and passed through a dryer at 70° C. to ensure evaporation of the volatile solvent tetrahydrofuran. In this particular example the copolymer is of vinylidene fluoride with 2 percent by weight of hexafluoropropylene, and has a sufficiently high molecular weight that its melt flow index (at a temperature of 230° C. and a load of 21.6 kg) is only 3.1 g/10 min.

The resulting anode comprises the aluminium-filled nanotubes along with copolymer, plasticising solvents and lithium salt. It can be combined with a composite cathode and a polymer electrolyte to form a reversible lithium ion cell.

The invention claimed is:

1. A rechargeable lithium cell incorporating an anode, a reversible cathode, and an electrolyte, said anode comprising carbon nanotubes, characterized in that the nanotubes contain within them a metal or a metalloid selected from the group consisting of aluminum, tin, metallic alloys containing aluminum or tin, or silicon, that can form alloys reversibly with lithium over a range of compositions wherein the metal or metalloid is inside said nanotubes.

2. A rechargeable lithium cell incorporating an anode as claimed in claim 1, wherein the carbon nanotubes are filled with said metal or metalloid.

3. A rechargeable lithium cell incorporating an anode, a reversible cathode, and an electrolyte, said anode comprising carbon nanotubes, characterized in that the nanotubes contain within them a metal or a metalloid selected from the group consisting of aluminum, tin, metallic alloys containing aluminum or tin, or silicon, that can form alloys reversibly with lithium over a range of compositions wherein the metal or metalloid is inside said nanotubes, and wherein said carbon nanotubes are bound together by a polymeric binder.

4. A rechargeable lithium cell incorporating an anode as claimed in claim 3, wherein the carbon nanotubes are filled with said metal or metalloid.

5. A rechargeable lithium cell incorporating an anode, a reversible cathode, and an electrolyte, said anode comprising carbon nanotubes, characterized in that the nanotubes contain within them a metal or a metalloid selected from the group consisting of aluminum, tin, metallic alloys containing aluminum or tin, or silicon, that can form alloys reversibly with lithium over a range of compositions wherein the metal or metalloid is inside said nanotubes, wherein said carbon nanotubes are bound together by a polymeric binder, and said anode comprises both a polymeric binder and a plasticising solvent.

6. A rechargeable lithium cell incorporating an anode as claimed in claim 5, wherein the carbon nanotubes are filled with said metal or metalloid.

* * * * *